(12) United States Patent
Phillips et al.

(10) Patent No.: US 10,404,704 B2
(45) Date of Patent: Sep. 3, 2019

(54) COMMUNICATION MECHANISM FOR DATA PROCESSING DEVICES

(71) Applicant: ARM IP Limited, Cambridge (GB)

(72) Inventors: Amyas Edward Wykes Phillips, Cambridge (GB); Milosch Meriac, Cambridge (GB)

(73) Assignee: ARM IP Limited, Cambridge (GB)

( * ) Notice: Subject to any disclaimer, the term of this patent is extended or adjusted under 35 U.S.C. 154(b) by 176 days.

(21) Appl. No.: 15/509,040

(22) PCT Filed: Aug. 18, 2015

(86) PCT No.: PCT/GB2015/052402
§ 371 (c)(1),
(2) Date: Mar. 6, 2017

(87) PCT Pub. No.: WO2016/038331
PCT Pub. Date: Mar. 17, 2016

(65) Prior Publication Data
US 2017/0264613 A1 Sep. 14, 2017

(30) Foreign Application Priority Data

Sep. 9, 2014 (GB) .................................. 1415942.0

(51) Int. Cl.
*H04L 29/06* (2006.01)
*H04W 12/06* (2009.01)
(Continued)

(52) U.S. Cl.
CPC ............ *H04L 63/10* (2013.01); *H04L 9/3265* (2013.01); *H04L 63/0428* (2013.01);
(Continued)

(58) Field of Classification Search
CPC ... H04L 63/10; H04L 63/0428; H04L 9/3265; H04L 63/0823; H04L 63/0884; H04W 12/08; H04W 12/06; H04W 84/18
See application file for complete search history.

(56) References Cited

U.S. PATENT DOCUMENTS 6,980,660 B1* 12/2005 Hind .................... H04L 63/0823
380/277
7,428,754 B2* 9/2008 Neumann ............... G06F 21/32
380/280
(Continued)

FOREIGN PATENT DOCUMENTS

EP  2 666 266  5/2016
WO  WO 02/15523  2/2002
(Continued)

OTHER PUBLICATIONS

Ekberg et al., "The Untapped Potential of Trusted Execution Environments on Mobile Devices", 2014, IEEE, pp. 29-37. (Year: 2014).*

(Continued)

*Primary Examiner* — Matthew Smithers
(74) *Attorney, Agent, or Firm* — Nixon & Vanderhye P.C.

(57) ABSTRACT

A method for controlling communications between a data processing device in a first network and a target service in a second network via a gateway apparatus, the method comprising: transmitting a request to communicate with the target service from the data processing device to the gateway apparatus; transmitting device credentials from the data processing device to the gateway apparatus, wherein the credentials comprise information relating to the target service; verifying at the gateway apparatus an authentication status of the data processing device based on the device credentials; establishing a communication path between the
(Continued)

data processing device and the target service if the authentication status is verified.

16 Claims, 7 Drawing Sheets

(51) Int. Cl.
    *H04L 9/32* (2006.01)
    *H04W 12/08* (2009.01)
    *H04W 84/18* (2009.01)

(52) U.S. Cl.
    CPC ...... *H04L 63/0823* (2013.01); *H04L 63/0884* (2013.01); *H04W 12/06* (2013.01); *H04W 12/08* (2013.01); *H04W 84/18* (2013.01)

(56) References Cited

U.S. PATENT DOCUMENTS

| | | | | |
|---|---|---|---|---|
| 8,543,665 | B2* | 9/2013 | Ansari | G06Q 30/04 709/218 |
| 2006/0209789 | A1 | 9/2006 | Gupta et al. | |
| 2006/0291483 | A1 | 12/2006 | Sela | |
| 2008/0065776 | A1* | 3/2008 | Moloney | H04L 63/06 709/229 |
| 2009/0132813 | A1* | 5/2009 | Schibuk | G06Q 20/223 713/158 |
| 2009/0287922 | A1* | 11/2009 | Herwono | H04L 9/0822 713/155 |
| 2010/0189011 | A1 | 7/2010 | Jing et al. | |
| 2011/0319056 | A1* | 12/2011 | Toy | H04L 9/3226 455/412.2 |
| 2012/0072507 | A1* | 3/2012 | Chen | H04L 12/1836 709/206 |
| 2013/0340048 | A1* | 12/2013 | Sebastian | H04L 63/08 726/4 |
| 2014/0007182 | A1* | 1/2014 | Qureshi | G06F 21/10 726/1 |

FOREIGN PATENT DOCUMENTS

| | | |
|---|---|---|
| WO | WO 2013/065037 | 5/2013 |
| WO | WO 2013/160140 | 10/2013 |

OTHER PUBLICATIONS

International Preliminary Report on Patentability dated Mar. 23, 2017 in PCT/GB2015/052402, 9 pages.
International Search Report and Written Opinion of the ISA for PCT/GB2015/052402, dated Nov. 9, 2015, 11 pages.
Search Report for GB1415942.0, dated Jan. 28, 2015, 6 pages.

* cited by examiner

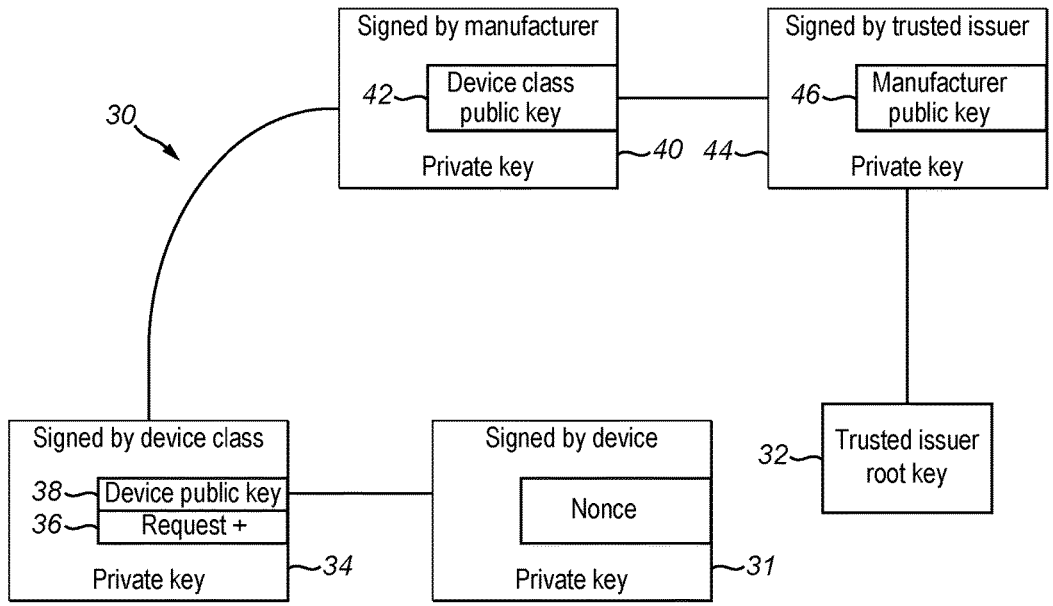

FIG. 4a $34 \begin{Bmatrix} \text{<Bw peak limit (Kb/10min)>} \\ \text{<Bw daily limit (Kb/day)>} \\ \text{<Target host URL/address>} \\ \text{(including wildcards)} \\ \text{[Pub key of device]} \\ \text{[signature using device class} \\ \text{private key} \end{Bmatrix}$

FIG. 4b $40 \begin{Bmatrix} \text{[Device class public key]} \\ \text{[signature using manufacturer} \\ \text{private key} \end{Bmatrix}$

FIG. 4c $44 \begin{Bmatrix} \text{[Manufacturer public key]} \\ \text{[signature using trusted} \\ \text{issuer private key} \end{Bmatrix}$

FIG. 4d

COMMUNICATION MECHANISM FOR DATA PROCESSING DEVICES

This application is the U.S. national phase of International Application No. PCT/GB2015/052402 filed 18 Aug. 2015, which designated the U.S. and claims priority to GB Patent Application No. 1415942.0 filed 9 Sep. 2014, the entire contents of each of which are hereby incorporated by reference.

The present invention relates to the field of data processing. More particularly, the invention relates to controlling communications between a data processing device and a service.

There are ever increasing numbers of devices within the home, office buildings or the outdoor environment that have processing and communication capabilities which allow such devices to interact with other processing devices and cloud services. Furthermore, there are also an increasing number of mobile-mobile devices which allow a user to connect to cloud services over a network connection.

Everyday objects and relatively small scale processing devices may be connected to each other and to central platforms as part of the "Internet of Things" (IoT). For example, a heating system in the home may gather information from various temperature sensors and control the activation of heaters based on the gathered information; a factory pollution monitoring sensor may gather information from various chemical sensors and arrange maintenance based on the gathered information; whilst a healthcare provider may use wireless sensors, such as a heart rate monitor to track the health of patients whilst at home. In the cases described above the data is generally forwarded to a cloud service on the internet.

However, such devices tend to have problems accessing network enabled devices to access the network because of verification problems, and therefore devices experience problems uploading the gathered data to the cloud, thereby detracting from the user experience.

It would therefore be advantageous to address the aforementioned problems.

According to a first aspect of the invention there is provided a method for controlling communications between a data processing device in a first network and a target service in a second network via a gateway apparatus, the method comprising: transmitting a request to communicate with the target service from the data processing device to the gateway apparatus; transmitting device credentials from the data processing device to the gateway apparatus, wherein the device credentials comprise information relating to the target service; verifying at the gateway apparatus an authentication status of the data processing device based on the device credentials; establishing a communication path between the data processing device and the target service if the authentication status is verified.

The method may further comprise: transmitting gateway apparatus credentials from the gateway apparatus to the data processing device; verifying the gateway apparatus credentials at the data processing device.

The method may further comprise: transmitting an identity authentication challenge from the gateway apparatus to the data processing device; transmitting a response to the identity authentication challenge from the data processing device to the gateway apparatus; verifying the response to the identity authentication challenge at the gateway apparatus.

The method may further comprise: receiving a traffic policy certificate comprising information relating to the data processing device from a resource associated with a trusted party, wherein the trusted party has a relationship with the gateway apparatus and the data processing device; confirming the authentication status of the device credentials with the resource associated with the trusted third party.

The method may further comprise: transmitting a gateway credential from the gateway apparatus to the data processing device; verifying the gateway credential at the gateway apparatus.

The method may further comprise: maintaining the communication path between the data processing device and the target service if the status of the data processing device is authenticated by the resource.

The method may further comprise: terminating the communication path between the data processing device and the target service if the status of the data processing device is not authenticated by the resource.

The identity authentication challenge may comprise a nonce, and wherein the response to the identity authentication challenge may comprise signing the nonce with a cryptographic key associated with the data processing device.

The device credentials may comprise a device certificate issued by the trusted party, wherein the device certificate comprises the information relating to the target service and, wherein the information relating to the target service comprises an indication of the location of the target service in the second network, including: a URL, Host Name, IPv6 address and/or an IPv4 address.

The device certificate further comprises permissions associated with the data processing device, wherein the permissions include: bandwidth allowance, traffic allowance over a period, and/or peak traffic allowance for a defined period.

The device credentials may comprise a certificate chain, wherein the certificate chain is traceable to the trusted party.

The request to communicate with the target service may comprise a signal known to the gateway apparatus, wherein the signal may comprise a cryptographic key of the trusted party.

The signal may comprise a string, a class or a globally unique identifier (GUID) or universally unique identifier (UUID).

The method may further comprise: receiving the signal at the gateway apparatus; determining whether access to the second network is available at the gateway apparatus; if it is determined that access to the second network is available, communicating the availability of access to the data processing device, wherein the second network may be the internet.

The method may further comprise: provisioning the data processing device from the target service.

The first network may comprise a plurality of nodes arranged in a mesh network.

The method may further comprise: connecting the data processing device to a node of the plurality of nodes using an unsecure network connection of the node; transmitting the request from the node to the gateway apparatus using the shortest communication path through the mesh network.

The method may further comprise: encrypting the communication path through the mesh network.

The gateway may comprise a mobile device.

The step of connecting the data processing device to a node of the plurality of nodes using an unsecure network connection of the node may occur over one of Bluetooth Low Energy, WiFi, WiFi direct or ZigBee.

The step of transmitting the request from the node to the gateway apparatus using the shortest communication path through the mesh network may occur over one of Bluetooth Low Energy, WiFi, WiFi direct or ZigBee.

The step of transmitting a request to communicate with the target service and device credentials from the data processing device to the gateway apparatus may occur over one of Bluetooth Low Energy, WiFi, WiFi direct or ZigBee.

The request to communicate with the target service and the device credentials may be transmitted in the same data packet.

The gateway apparatus may be a node within a mesh network.

The method may comprise: limiting communication between the data processing device and the target service in only one direction.

The method may comprise: monitoring data communications between the data processing device and the target service.

The method may comprise: attributing responsibility for the data communications to a party such as the target service, or manufacturer of the device, or user of the device.

According to a second aspect, there is provided a method of receiving at a data processing device in a first network communications from a target service in a second network via a gateway apparatus, the method comprising: establishing a communication path with the gateway apparatus; transmitting a request to communicate with the target service to the gateway apparatus; transmitting device credentials to the gateway apparatus; transmitting a communication between the data processing device and the target service.

The device credentials may comprise a certificate, wherein the certificate is part of a certificate chain, and wherein the certificate comprises the location of the target service.

The communication between the data processing device and the target service may comprise provisioning data for the device from the target service.

The gateway apparatus may comprise a node within a mesh network.

The method may comprise: monitoring the communication between the data processing device and the target service.

The method may comprise: attributing responsibility for the communication to a party such as the target service, or manufacturer of the device, or user of the device.

According to a third aspect, there is provided an apparatus comprising processing circuitry, memory circuitry and communications circuity, wherein the apparatus is capable of controlling communications between a data processing device in a first network and a target service in a second network, wherein the apparatus is capable of: receiving, from the data processing device, a request to communicate with the target service and credentials associated with the data processing device; verifying an authentication status of the data processing device based on the credentials; and controlling a communication path between the data processing device and the target service if the authentication status is verified.

The apparatus may be capable of communicating with a resource of a trusted party to receive traffic policy certificates therefrom, wherein the apparatus may be capable of controlling the communication path between the data processing device and the target service based on the traffic policy certificates.

The apparatus may be responsive to signals within public broadcasts from a data processing device in proximity thereto.

According to a fourth aspect there is provided a data processing device, comprising processing circuitry, memory circuitry and communications circuitry, wherein the data processing device is operable to communicate with a gateway apparatus to request a communication path with a target service in a second network, the data processing device comprising a device credential associated therewith, wherein the credential comprises information relating to the location of the target services, and wherein the credential is verified as being approved by a trusted party, wherein the trusted party has a relationship with the gateway apparatus and the data processing device.

The device credential may comprise permissions associated with the data processing device.

The device credential may comprise a certificate chain operable to demonstrate a chain of trust traceable to a trusted party known to the gateway apparatus.

The data processing device may be operable to generate public broadcasts comprising signals, wherein the signals comprise a request to communicate with a gateway apparatus.

According to a fifth aspect there is provided a resource comprising processing circuitry, memory circuitry and communications circuity, wherein the resource is operable to communicate with a gateway apparatus, wherein the resource is configured to generate traffic policy certificates in respect of a data processing device and transmit the traffic policy certificates to the gateway apparatus; and wherein the resource is further operable to receive credentials associated with a data processing device from the gateway apparatus and authenticate the credentials and transmit an authentication result to the gateway apparatus.

The resource may comprise a blacklist database comprising information relating to the data processing device.

Embodiments will now be described, by way of example only, and with reference to the accompanying drawings of which:

FIG. 4a is a schematic diagram of a certificate chain structure according to an embodiment;

FIG. 4b shows an illustrative example of a certificate of the certificate chain structure of FIG. 4a;

FIG. 4c shows a further illustrative example of a certificate of the certificate chain structure of FIG. 4a;

FIG. 4d shows a further illustrative example of a certificate of the certificate chain structure of FIG. 4a;

FIG. 4e shows an illustrative example of a chain of trust provided by the certificate chain structure of FIG. 4a;

Figure 1:
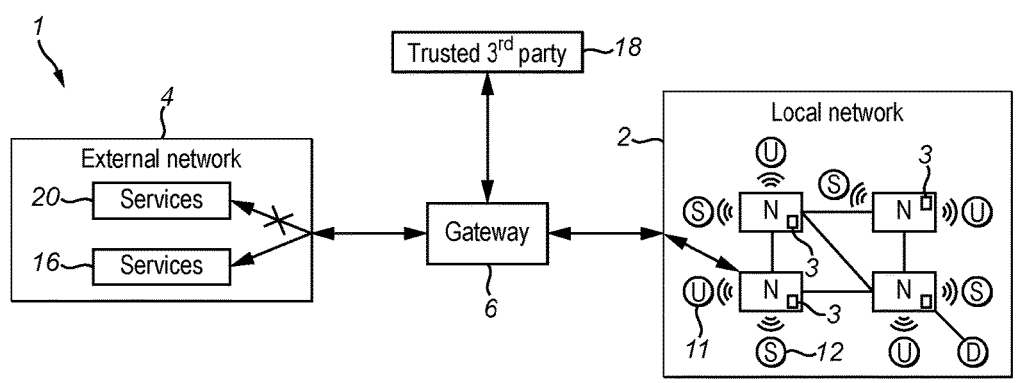
FIG. 1 is a schematic diagram of a network infrastructure, comprising a local network and an external network according to an embodiment.

FIG. 1 is a schematic diagram showing an illustrative example of a network infrastructure 1, comprising a first network 2 and a second network 4, whereby devices (D) (one shown in FIG. 1) within the first network are operable to communicate with services in the second network 4 via a gateway 6.

In the present example, the first network 2 is a local network (e.g. an office environment), whilst the second network 4 is an external network (e.g. the internet), whereby devices (D) within the local network 2 are operable to communicate with the external network 4 via a gateway apparatus 6.

The gateway 6 (for example a border router or a mobile phone) generally comprises processing circuitry (not shown) memory circuitry (not shown), and communications circuitry (not shown) and is configured to control communications between the local network 2 and the external network 4, and to determine and control access rights and privileges of devices (D) within the local network 2 based on credentials associated with the devices (D).

The local network 2, comprises a plurality of nodes (N) (e.g. Bluetooth Low Energy BLE routers/mesh routers; WiFi routers/mesh routers, WiFi direct routers/mesh routers, ZigBee routers/mesh routers) arranged, in the present example, as a mesh network. The nodes (N) have an established relationship with the local network 2, whereby, for example, the nodes (N) are provided with a network key 3 for the local network 2.

Whilst the nodes (N) are operable to communicate with other nodes (N) in the mesh network using a primary protocol (e.g. using a WiFi/BLE/ZigBee mesh protocol), the nodes (N) are operable to communicate with devices (D) seeking to connect therewith using the primary protocol and/or using a protocol other than the primary protocol. For example, if the nodes (N) are WiFi routers, the node-to-node communication within the mesh network 8 will be undertaken using WiFi protocol. However, each node (N) is also operable to communicate with devices (D) using the primary WiFi protocol or by using a different protocol, for example, using BLE or ZigBee protocol.

It will be appreciated that the nodes (N) may have access to several networks (e.g. between 1 and 10 networks), comprising at least one secured network and at least one unsecured (open) network.

In the present example, the nodes (N) are shown to generate unsecure network announcements (U) 11 and, optionally, secure network announcements (S) 12, whereby such announcements include the service set ID (SSID) or extended basic service set ID (ESSID) of the network.

It will be appreciated that any number of data processing devices can be used to connect to the nodes (N). Such data processing devices include, but are not limited to, mobile devices (e.g. smartphones), wearable devices (smartwatches, heart rate monitors) or embedded devices e.g. as described below in relation to FIG. 7, and including, but not limited to, heartbeat monitors, fitness bands, pens, light bulbs or any suitable IoT device.

In the present example, device (D) is an unprovisioned device which requires to connect to a target service 16 (e.g. a server, website, application, device) located on the external network 4, from which it can obtain provisioning data. However, it will readily be appreciated that the device (D) may already be provisioned and is seeking to access the service 16 for another reason (e.g. to upload data thereto or to obtain firmware therefrom)

The device (D) comprises identification credentials provided thereon. In the present example, the credentials comprise a cryptographic key unique to the device (e.g. a private key), whereby the device is operable to sign and encrypt communications with its cryptographic key. Devices having a corresponding key (e.g. the device's (D) public key) can then verify that communications originated from the device (D) by verifying/decrypting the communications using the public key. Such techniques are well known to persons skilled in the art.

The device (D) also comprises information relating to the service 16 within the external network 4 which the device (D) requires access to. The information includes, for example: URLs, Host Names, IPv6 addresses and/or IPv4 addresses of the service 16. In the present example the information is provided within a device certificate(s) installed on the device. The certificate(s) may also list permissions associated with the device (D), including, for example: bandwidth allowance, traffic allowance over a period, and/or peak traffic allowance for a defined period.

The device (D) also comprises verification associated with a trusted $3^{rd}$ party (trusted issuer 18) that the certificate (s) is approved by the trusted issuer. The verification may, for example comprise a cryptographic key or a signature of the trusted issuer, which is installed on manufacture of the device (D). The trusted issuer 18 has a relationship with the gateway 6, whereby the gateway 6 is operable to recognise the verification associated with the trusted issuer 18. The trusted issuer 18 may comprise a hardware or software resource (trusted issuer resource), such as a server, registry, website, cloud service.

In the present embodiment, the gateway 6 comprises a cryptographic key of the trusted issuer 18 thereon.

On entering the internal network 2, (for example, by being powered on in proximity to one of the nodes (N)), the device (D) scans for an unsecured network announcement (U) to which it can connect.

On detecting the unsecured network announcements (U) from the nodes (N), the device (D) joins the network automatically if the unsecure network 11 is unencrypted, or if encrypted or requires pairing, by using a known password/pairing key, which may, for example, be printed on the device by a manufacturer and entered by a user on a configuration page of the node (N).

The node (N) to which the device connects, establishes an encrypted connection with the gateway 6, using the shortest possible communication path, The encrypted connection may be established using any suitable encryption protocol, for example using TLS, such as secure socket layer security (SSL).

The communication path for the encrypted connection can extend through other nodes (N) in the local network 2 as required to fulfil the requirement of the shortest communication path to the gateway 6.

Any suitable method/protocol may be used to identify the shortest communication path, for example by analysis of signal strength of the surrounding nodes (N), or using the open shortest path first (OSPF) protocol.

Using the encrypted connection provides security for the local network 2 and the external network 4, in that if the device (D) is compromised by an attacker (for example by spyware/malware), the attacker cannot break out from the encrypted connection, and, so cannot compromise other nodes (N) or other devices connected to nodes (N) within the local network 2.

Furthermore using the shortest communication path also provides security for the local network 4 in that the number of nodes (N) which an attacker could compromise is minimised.

Once the encrypted connection is established, the request from the device (D) is forwarded to the gateway 6. The gateway 6 verifies the device's credentials, and also verifies that the device certificate is approved by the trusted issuer 18. The verification by the device (D) is undertaken locally at the gateway 6, whereby, for example, the gateway is operable to verify the device's credentials and certificate, for example by using cryptographic keys received from the trusted issuer 18 and/or the device (D).

On verifying the device's (D) credentials and the certificate, the gateway 6 controls communication between the device (D) and the service 16 listed in the certificate for example, for provisioning of the device (D) by the service 16 or for uploading data to the service 16. It will be recognised that service 16 may comprise a single service, or may comprise a plurality of services to which the device requests a connection, or the service 16 may be the internet as a whole, whereby the certificate requests unlimited access to the internet.

The gateway 6 is operable to monitor communications between the device (D) and the service 16, such that it can attribute responsibility for any data traffic to a party (e.g. a company, manufacturer, user of a device, owner of a device). For example, if a device (D) uploads data to service 16, and incurs traffic charges, then the charges could be passed to, for example, a company which owns the service 16 (traceable through information on the certificate).

If the credentials and/or the certificate presented to the gateway 6 are not valid, then the gateway 6 is operable to prevent access to the service 16 listed within the certificate. The gateway 6 will also prevent access to services 20 which are not listed in the certificate by enforcing a communication block on such services 20 for the device (D).

Figure 2:
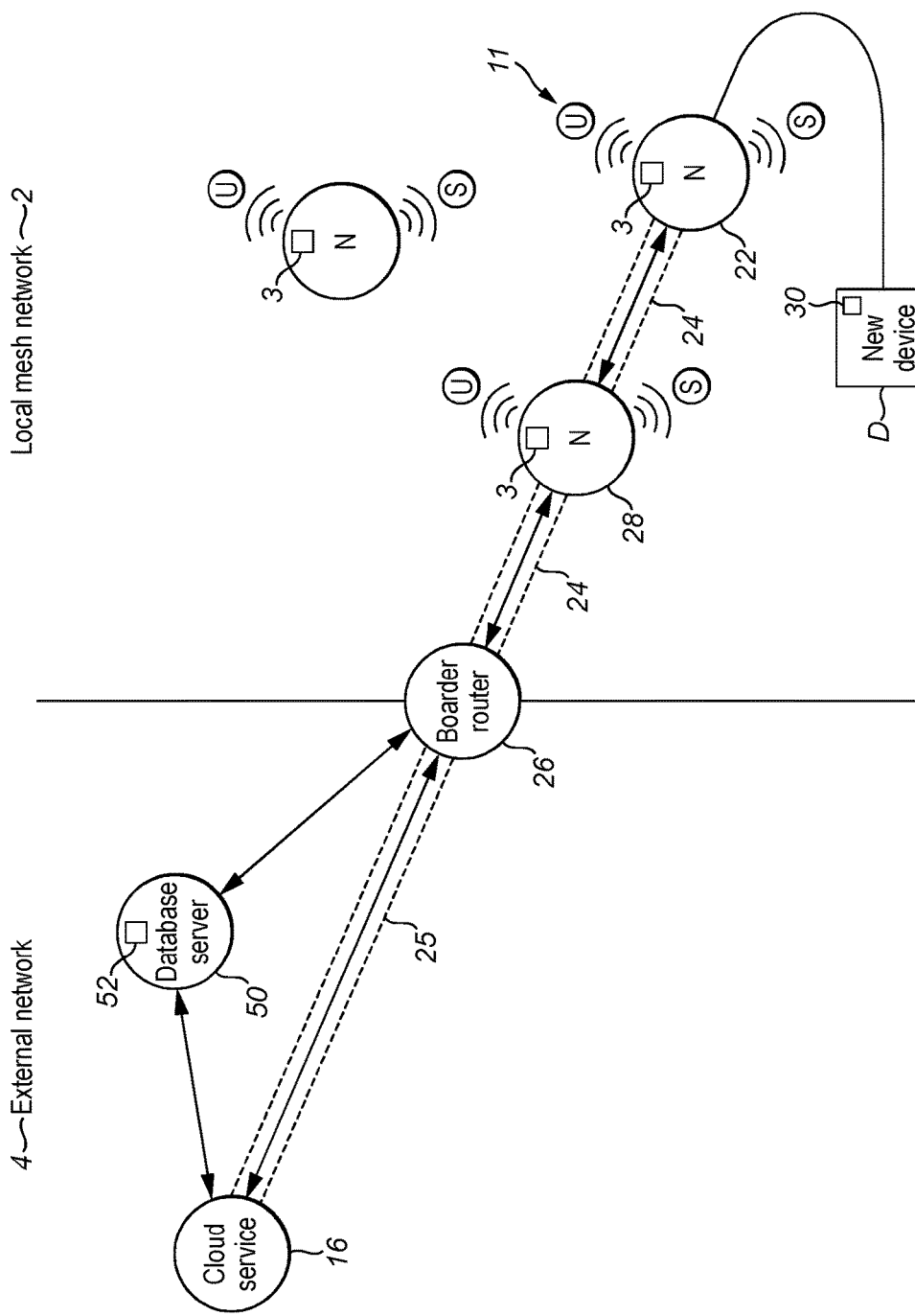
FIG. 2 is a schematic diagram of the network infrastructure of FIG. 1 in greater detail.
Figure 3:
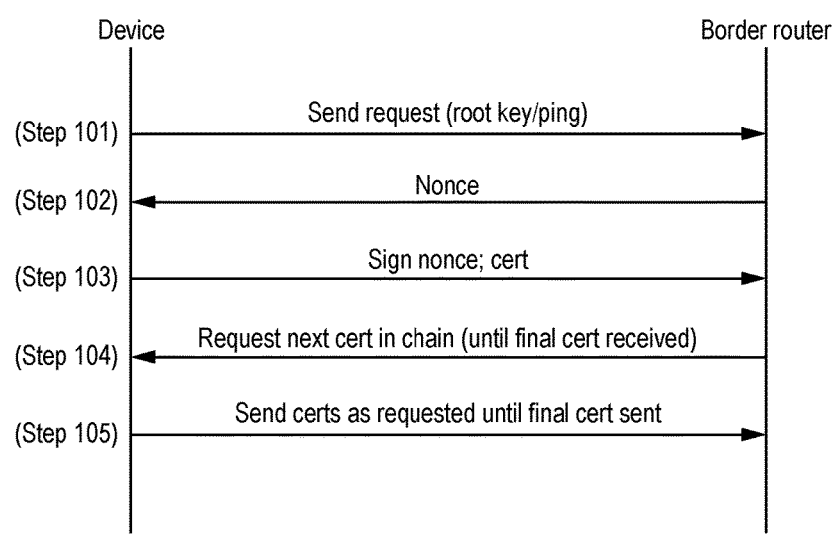
FIG. 3 is a schematic diagram showing the communication flow between a device and a border router of FIG. 2.

FIG. 2 illustrates in greater detail, an example of a communication between device (D), within the local network 2 and the service 16 (shown as a cloud service in FIG. 2) via a gateway apparatus, which is shown as a border router 26 in the present illustrative example, whilst FIG. 3 describes the communication flow between the device (D) and border router 26. In the present example, a certificate chain structure 30, comprising certificates relating to different aspects of the device, is provided on the device, e.g. at manufacture, in order to prove that it is permitted to access the service 16. The certificate chain structure 30 is described in FIGS. 4a-4d.

In the present example, the device (D) connects with node 22 using the unsecure network connection of node 22, for example over BLE and requests to connect to the border router 26.

Using the network key 3, the node 22 establishes an encrypted communication path 24 (e.g. using TLS) with the border router 26 via node 28 (e.g. using WiFi meshing), using the shortest communication path to the border router 26 and forwards the request from the device (D) to the border router 26 (Step 101 FIG. 3). In the illustrative example, the request is shown to originate from the device (D) and not the node (N) which forwards the request to the border router 26.

In the present example, the request comprises a root key 32 (shown in FIG. 4a) associated with the trusted issuer which is installed on the device (D) at manufacture (e.g. in firmware). The root key 32 is also known to the border router 26 and is recognised as a request to communicate with the border router 26. In alternative embodiments, the request may comprise a basic ping, or any suitable signal which indicates that a device wishes to communicate with the border router 26.

On receiving the root key 32 from the device (D), the border router 26 recognises the root key 32 as a request from the device (D) to communicate therewith, and the border router 26 returns a challenge for the device (D) to prove that it is the device (D) which it purports to be (Step 102 FIG. 3).

The device (D) may also require that the border router 26 identifies itself to the device (D) to prove that it is trusted to communicate therewith, i.e. mutual authentication. For example, the border router 26 may recognise that the request from the device (D) to communicate therewith also requires the border router 26 to identify itself to the device (D).

In order to identify itself to the device (D), the border router 26 may, for example, provide a gateway certificate cryptographically signed by the trusted issuer to the device, which the device can verify with the root key 32. The gateway certificate is installed on the border router 26 at manufacture, or it may be obtained subsequently from the trusted issuer resource in communication therewith. In the present illustrative example, the trusted issuer resource is database server 50.

In the present example, the border router 26 issues a cryptographic nonce, which the device (D) cryptographically signs, for example, using a cryptographic key installed thereon by a manufacturer (e.g. the device's private key). The signed nonce 31 is illustrated in FIG. 4a.

On returning the signed nonce 31 to the border router 26, the device (D) also attaches a certificate containing the device's public key, and which also contains a list of target services to which it requests access, and any associated permissions (Step 103 FIG. 3).

If not satisfied with the device's credentials, the border router 26 requests that the device (D) further proves that it is permitted to access the service 16 listed in the certificate (Step 104 FIG. 103).

Step 104 is repeated whereby the device (D) transmits a certificate chain 30 to the border router 26 to prove that it is permitted to access the service 16, whereby each certificate in the chain relates to a different aspect of the device, whereby each certificate is cryptographically signed to demonstrate a chain of trust which can ultimately be traced to the trusted issuer as will be described below, to demonstrate the highest level of trust.

For example, a certificate may relate to the specific class of device within which the device (D) falls (e.g. fitness equipment/medical equipment/timekeeping equipment). Another certificate may relate to the device manufacturer, another certificate may relate to a particular type of communication stack used in the device, whilst another may relate to the type of processor used in the device.

In the present example, the certificate chain comprises a device certificate, a device class certificate and a manufacturer certificate.

At step 105, the device (D) responds to the requests for further certificates by transmitting all certificates in the chain in turn, until it transmits the final certificate.

The first certificate 34, which in the present example is the device certificate, comprises the information on the service 16 which the device (D) requires access to, for example: URLs, Host Names, IPv6 addresses and/or IPv4 addresses. The certificate may also list permissions associated with the device (D), including, for example: bandwidth allowance, traffic allowance over a period (e.g. KB/day), and/or peak traffic allowance for a defined period (e.g. (KB/10 min). The first certificate 34 also comprises the device's public key 38, and is signed using the device class's private key. An example certificate code for the device certificate 34 is shown in FIG. 4b.

The second certificate 40, which in the present example is a device class certificate, comprises the device class's public key 42 and is signed using the device manufacturer's private key. An example certificate code for the second certificate 40 is shown in FIG. 4c.

The third certificate 44, which in the present example is a manufacturer's certificate, comprises the device manufacturer's public key 46 and is signed using the trusted issuer's private key. An example certificate code for the third certificate 44 is shown in FIG. 4c.

The final certificate is signed using the trusted issuer's private key, which can be verified using the root key 32, or using a public key of the trusted issuer provided to the border router 26 by the trusted issuer, and therefore, the border router 26 verifies all the certificates, and further verifies the signed nonce provided by the device (D) using public keys within the certificate chain 30. Therefore, it will be seen that the certificate chain 30 is traceable to the trusted issuer.

Once the border router 26 is satisfied that the device (D) is approved to access the requested service 16 by the trusted issuer, and also verifies that the device (D) is that which it purports to be, then the border router 26 establishes an encrypted connection 25 (e.g. TLS) with the service 16 and allows device (D) to access the service 16 via the connection 25, thereby controlling the connection to the service 16 by the device (D).

However, if one of the certificates in the certificate chain 30 is not sent to the border router 26, the border router 26 is operable to prevent the device (D) accessing the service 16.

The border router 26 is operable to retain the cryptographic keys and certificates in a data store in memory, and so is operable to verify certificates received thereby without having to issue requests to devices.

The certificate chain structure provides for an intelligent approval/control mechanism by the border router 26, whereby, for example, if a particular class of device is found to be easily compromised or hacked, then the border router 26 is provided with instructions to communicate with the database server 50 to verify whether device (D) presenting a particular device class certificate 40 should be allowed or denied access to a particular service 16.

The functionality also applies to device certificates 34 and manufacturer certificates 44, whereby, if a manufacturer is identified to have manufactured easily compromised devices, or if the trusted issuer breaks its relationship with a particular manufacturer, then the border router 26 is provided with instructions to communicate with the database server 50 to verify whether device (D) presenting a particular manufacturer certificate 44 should be allowed or denied access to a particular service 16.

The instructions to communicate with the database server 50 may comprise, for example, a traffic policy certificate detailing the certificates affected. The traffic policy certificate may be generated and sent to the trusted issuer by any party, for example a manufacturer or web service 16 on identifying a potential issue with a device, class of device, or manufacturer. Alternatively the trusted issuer can generate a traffic policy certificate of its own volition.

The traffic policy certificate may instruct the border router 26 to connect the device (D) to the service 16 before communicating with database server 50, or the traffic policy certificate may request that the border router 26 deny access to the web service 16 until first communicating with the database server 50.

In the present example, the database server 50 comprises a blacklist database 52 having details of devices (e.g. device certificates), device classes (e.g. device class certificates) and manufacturers (e.g. manufacturer certificates) which are blacklisted from accessing the service 16, i.e. which are untrusted, and should be denied access to the service 16. The blacklist 52 may also include details of services to which requests for access should be denied.

Therefore, it will be appreciated that, using the functionality described above, it is possible for the border router to examine the certificate chain structure presented thereto by a device and selectively prohibit a single device from accessing a requested service if it is listed on the blacklist database. It will also be possible to selectively control access to services for a particular device, devices within a specific class or devices made by a common manufacturer if the respective certificates are on the blacklist database.

Figure 4E:
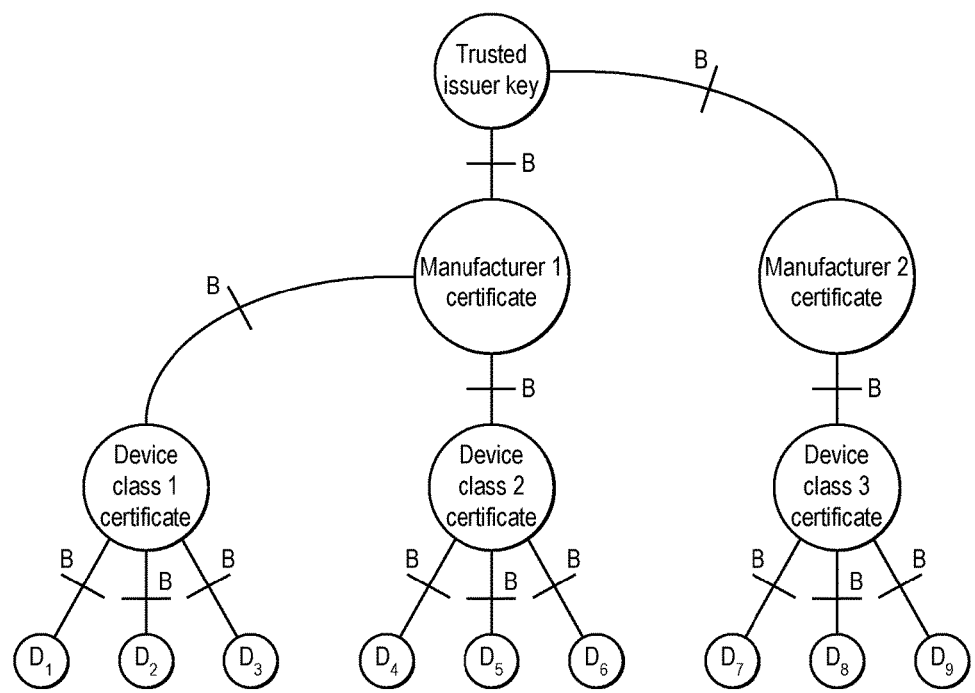

Such functionality is illustratively shown in FIG. 4e, whereby the boundaries (B) illustrate the different aspects of a device covered by a particular certificate, and how a gateway apparatus (e.g. border router) could identify specific devices, device classes, or manufacturers based on a certificate chain presented thereto. FIG. 4e also demonstrates how all certificates in a certificate chain are traceable to a trusted issuer.

For example, if device class 1 was found to be compromised, then the gateway, on receiving a traffic policy certificate relating to device class 1 from the trusted issuer, could prevent devices D1-D3, within device class 1, from accessing a service. However, if a traffic policy certificate was merely issued in relation to a particular device, for example D2, then the gateway can prevent D2 from accessing the service, without affecting access of devices D1, or D3-D9.

Furthermore, if a particular manufacturer becomes untrusted by the trusted issuer, a traffic policy certificate could be issued by the trusted issuer to the gateway to prevent any device made by that manufacturer from accessing services. For example, if Manufacturer 2 is identified to be a rogue manufacturer, then the trusted issuer would issue a traffic policy certificate in relation to manufacturer 2 to the gateway, and the gateway could prevent any devices made by Manufacturer 2 from accessing the service i.e. D7, D8 and D9 as shown in the example of FIG. 4e.

It will be seen in FIG. 4e that the root key has the highest trust level, with the device certificate having the lowest trust level, below the device class certificate, which in turn is below the manufacturer certificate.

Revocation of access to a service by the gateway is not required to be instantaneous. The database server is provided to verify certificates whilst communication is ongoing between the device and the service. However, it will be appreciated that communication may be prohibited at any time, and the gateway is operable to revoke access to a service for a device, device class or manufacture if a traffic policy certificate is issued even after communication between a device and service is initially allowed by the gateway.

Furthermore, all certificates may be provided with an expiration duration, such that, for example, if a certificate in a chain of certificates received from a device has expired, or if a certificate expires after the gateway allows access to the service, the gateway can verify with the database server as to whether an updated device certificate is available. In such a scenario, the gateway is operable to control (e.g. allow or deny) communication between the device and the service until the expiration issue is addressed. Alternatively, if a gateway device sends an expired gateway certificate to the device, then the device can determine whether or not to use the gateway for accessing the service.

In an embodiment, the gateway routinely requests an updated certificate (e.g. hourly/daily) from the database server, whereby if the gateway does not request an updated certificate within the expected timeframe (e.g. before expiry of its current certificate), such functionality is taken to be indicative of a compromised gateway, and the database server may not send any further certificates to the gateway even if the gateway subsequently requests an updated certificate.

In a further embodiment, the nodes (N) within the local network are configured to provide the functionality of the gateway, whereby on connecting to a node (N) within the local network, the device (D) and the node (N) undertake an authentication process as described above (e.g. a mutual authentication), whereby the node (N) controls communications between the device (D) and the target service 16.

In an embodiment, communication from the device (D) is controlled by the node (N) such that the device (D) can communicate with the target service 16 in only one direction (e.g. outbound communication from the device (D) to the target service 16).

In an alternative embodiment, two-way communication between the device (D) and target service 16 is provided by the node (N).

Whilst the functionality above is described in relation to a first network being a local network, and a second network being an external network, it will be appreciated that the first and second networks, may, in some embodiments, be the same network, with devices within the network communicating via a gateway.

Figure 5:
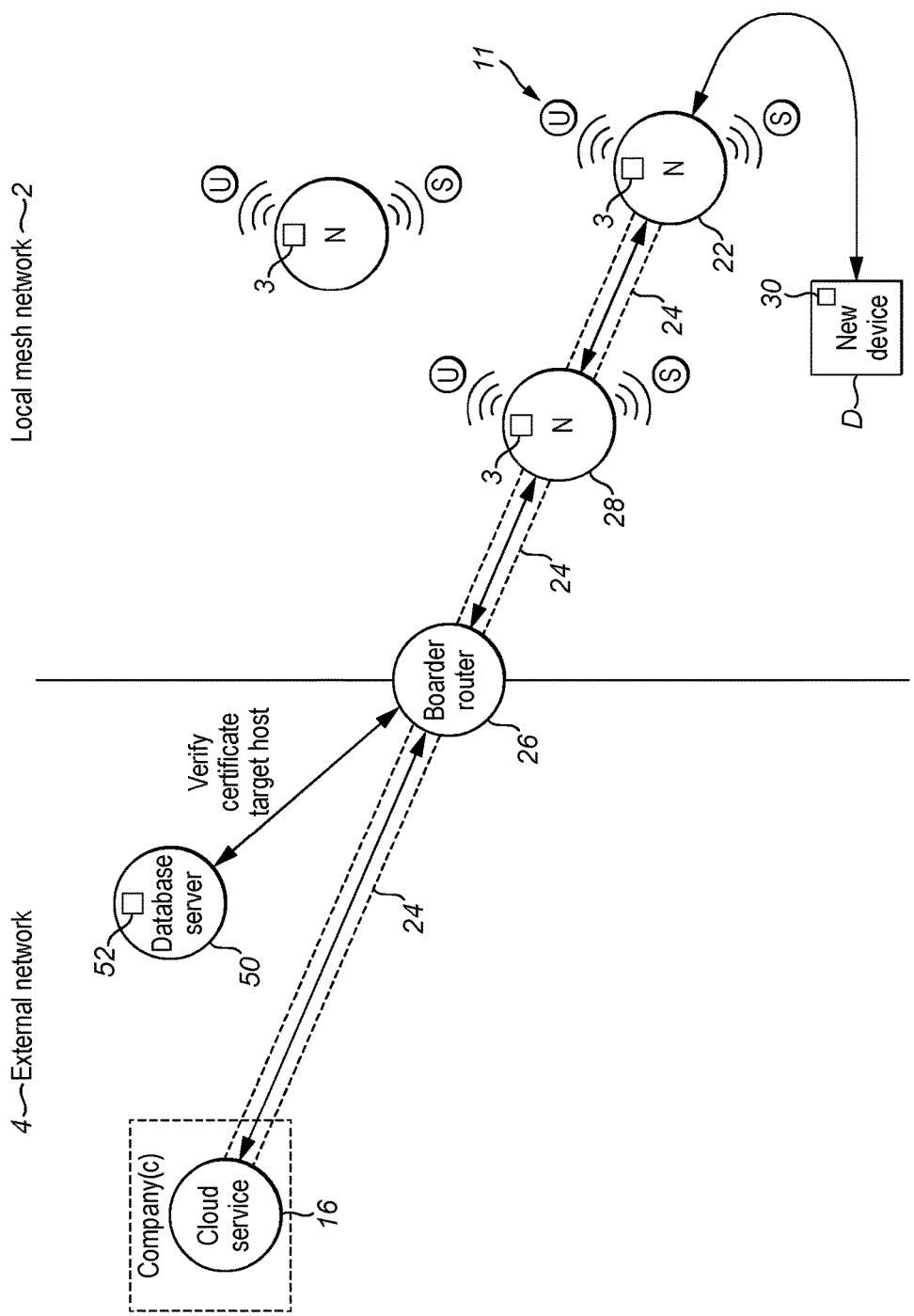
FIG. 5 is a schematic diagram of the network infrastructure of FIG. 2 in greater detail.

FIG. 5 describes illustrative examples of applications using techniques described herein. Like numbering will be used to describe like features described above.

In the following illustrative example applications, service 16 is a cloud service e.g. a website, which is hosted and managed by a company (C), whereby company (C) has a relationship with a manufacturer of device (D), or company (C) may be the manufacturer of the device (D). In any case, company (C) has a relationship with a trusted issuer.

The manufacturer installs certificates signed by the trusted issuer on the device (D) on the behalf of company (C), whereby the certificates comprise information relating to target service 16. Company (C) may have a contract or subscription with the trusted issuer to sign certificates, and may have a contract with the manufacturer to install the certificates on the device (D).

When the device (D) first accesses the service 16 (for example as described above), the service 16 is operable to provision the device (D) by, for example, signing the device's (D) certificate with its own cryptographic key, or by installing a new device certificate thereon, with further requests and/or permissions.

After provisioning by the service 16, the device (D) may send a request to the border router 26 as described in relation to FIG. 3, but whereby the original device certificate is replaced with the provisioned device certificate.

If verified, the provisioned device certificate will be associated with the company (C), and responsibility for the amount of data/bandwidth allowed to be sent between the provisioned device (D) and service 16 can be passed to the company (C). For example, any expense incurred by device (D) accessing the service can be passed to company (C)

As an illustrative example, company (C) may subscribe to the trusted issuer for device (D) to be provided with certain permissions e.g. a data allowance or bandwidth allowance for communications between the device (D) and service 16.

The permissions may be included in the provisioned device certificate, and if the device's data allowance/bandwidth exceeds the subscription, then the border router 26 is operable to prevent communications between the device (D) and web service 16, until, for example, company (C) increases the subscription. Alternatively, if the subscription payment ceases, the database server 50 can issue a signal to the border router 26 to prevent communications between device (D) and the service 16, or the database server 50 may issue a traffic policy certificate in respect of company (C).

In a further illustrative example, the company (C) may request for unlimited communications between the device (D) and the service 16, or request that device (D) is permitted to access other services on the external network, whereby company (C) agrees to pay any costs incurred by the device (D).

The agreement may, for example, be included in the device's certificate on manufacture, or may be provided within the provisioned certificate, whereby, on verifying the provisioned certificate, the border router 26 will allow unlimited access to the service 16, regardless of the amount of data consumed by the device (D). If the device (D) is subsequently compromised, and an attacker uses device (D) e.g. to send large amounts of SPAM communications, then any costs incurred as a result of the attack can be passed to company (C). Furthermore, company (C) may request the trusted issuer prevent device (D) from accessing the service, and the trusted issuer can issue a signal to the border router 26 to prevent communications between device (D) and the service 16, or the database server 50 may issue a traffic policy certificate in respect of device (D).

In a further illustrative example, access to the service 16 by the device (D) can also be denied by the border router 26 if, for example, the web service fails to pay the necessary subscription fee to the trusted issuer, whereby company (C) can be added to the blacklist database 52 by the trusted issuer and/or a traffic policy certificate generated to instruct the border router 26 to check if company (C) has fulfilled is subscription requirements before allowing any device (D), or any device within a particular class owned by company (C) to access a service.

In a further illustrative example, company (C), such as a mobile phone operator, may request for unlimited communications between a user smartphone (D) and the internet, whereby the mobile phone operator agrees to pay any costs incurred by the user smartphone (D). The agreement may, for example, be included within the device certificate installed on the smartphone by the manufacturer, or may be provided in a certificate upon service 16 provisioning the smartphone as described above.

On verifying the smartphone's certificate and validating the identity of the smartphone, the border router 26 will allow constant access to the internet, regardless of the amount of data consumed by the smartphone. The trusted issuer can pass the costs of the data onto the mobile phone operator (C), who in turn can pass the costs onto the owner of the user smartphone (D), whilst it will be appreciated that the trusted issuer is operable to instruct the border router 26 to terminate communications at any time, e.g. via the database server 50.

In a further illustrative example, company (C), such as an internet service provider (ISP), may request for unlimited communications between a user device (D), such as a washing machine, and a service 16, such as the washing machine manufacturer's website, whereby the internet service provider (ISP) agrees to pay any costs incurred by the washing machine communicating with the service 16. The agreement may, for example, be included within the device certificate installed on the washing machine at manufacture, or may be provided in a certificate upon service 16 provisioning the washing machine as described above.

On verifying the washing machine's certificate and validating the identity of the washing machine, the border router 26 will allow communication between the washing machine and the service 16, to allow the washing machine upload operating parameters/configurational data to the service 16. The trusted issuer can pass the costs of the communications between the washing machine and the service 16 onto the company (C), which in turn can pass the costs onto the manufacturer of the device.

Figure 6:
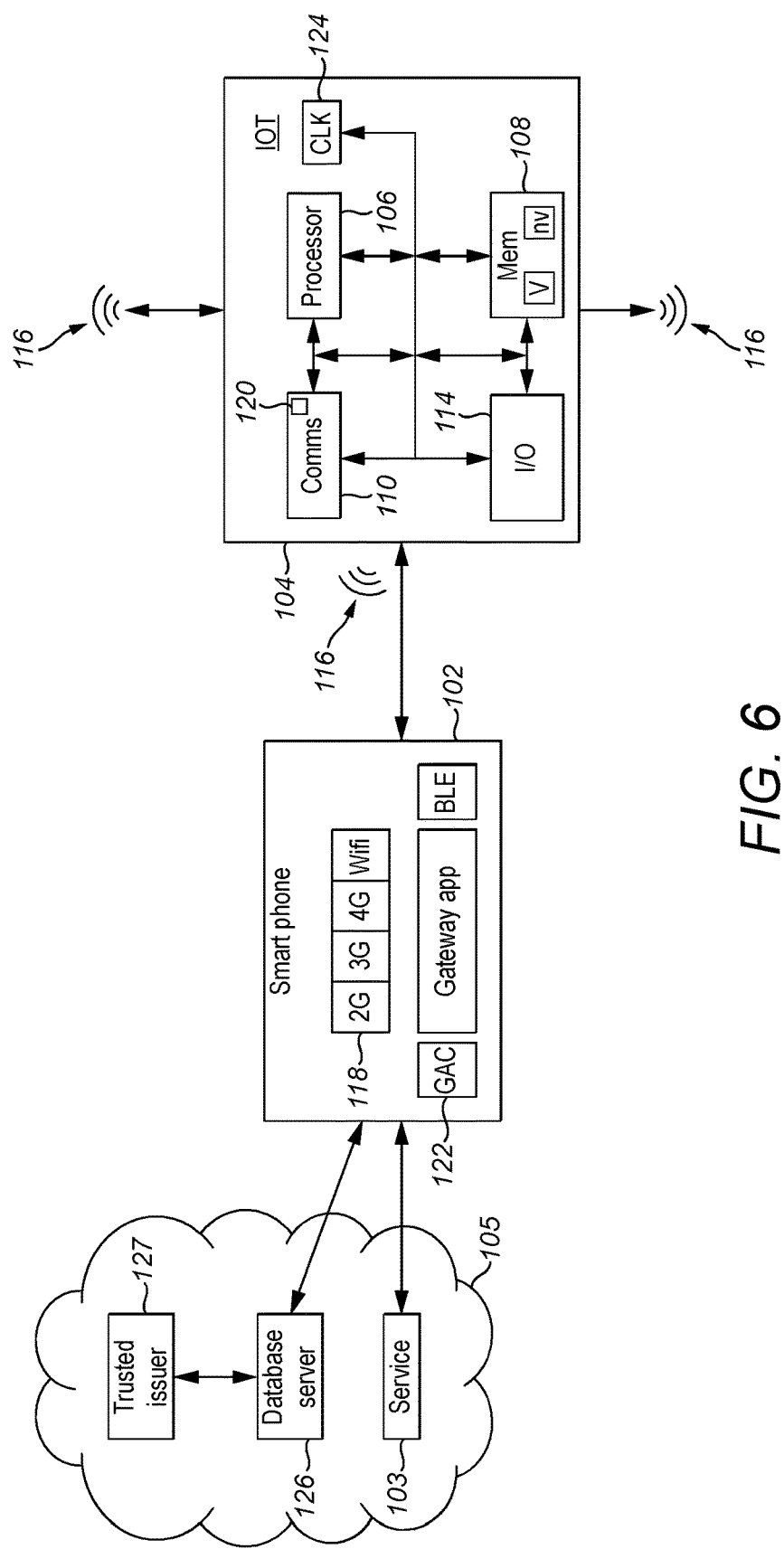
FIG. 6 is a schematic diagram of a network infrastructure having a data processing device and services on different networks according to an embodiment.

FIG. 6 shows, in a further embodiment, an illustrative example of a communication between a data processing device 104 and services 103 on a network 105 (e.g. the internet) via a mobile device 102 which can access the network.

Whilst any suitable mobile device may be used, such as smartphones, laptop devices, tablet devices, in the present example, the mobile device 102 is a smartphone, for example an iOS® based device or an Android® based device, whilst the data processing device 104 is an embedded device 104 suitable for use as an IoT device for uploading data to a cloud service, for example an ARM® based system on chip (SoC) of the type designed by ARM Limited of Cambridge, England.

Embedded device 104 comprises a processor core 106 for executing program instructions (for example application code), memory circuitry 108 (including both volatile (V) and non-volatile (NV) memory such as flash), and communications circuitry 110.

It will be appreciated that the communications circuitry 110 provides communications capabilities to allow the embedded device 104 communicate with devices remote therefrom, including, for example, gateways, servers, mobile devices, and/or other embedded devices via a wireless link (e.g. Bluetooth Low Energy (BLE), Bluetooth, Near Field Communication, WiFi, and ZigBee). It will be appreciated that the communications circuitry 110 is operable to comply with any required protocols and standards.

I/O circuit 114 provides sensing/monitoring/actuating functionality for the embedded device 104. The 110 circuitry may include, for example, an accelerometer for sensing movement, a speaker for emitting a sound or a sensor for detecting a stimulus within an external environment (e.g. a transducer to detect a heartbeat).

It will be appreciated that the processor core 106 controls the operation of the embedded device 104 and the circuitry within the embedded device 104, for example, by using an operating system such as a real-time operating system (RTOS), such as Abassi, FreeRTOS, Fusion to name but a few.

Devices comprising location based service functionality, i.e. location based devices (LBD) are known to transmit public broadcasts comprising application specific data e.g. using BLE. A compatible device running an application responsive to the public broadcasts can then initiate the compatible application and use the data within the public broadcast to perform a specific function e.g. to identify its position relative to the beacon. Such devices include, for example, iBeacon™ by Apple®.

In the present embodiment, the embedded device 104 is configured to generate public broadcasts, whereby an application (e.g. a device gateway application) installed on the embedded device 104 causes the embedded device 104 to generate public broadcasts 116 comprising a gateway signal (e.g. a string, a class or a globally unique identifier (GUID) or universally unique identifier (UUID)).

In the present example, the public broadcasts 116 are announced over BLE, whereby the public broadcasts are generated using a suitable power source 120 within the embedded device 104, for example a 3V coin cell battery.

The mobile device 102 comprises a corresponding gateway application (e.g. mobile gateway application), which is responsive to the gateway signal within the public broadcasts 116 from embedded device 104. On receiving the gateway signal the mobile gateway application is operable to cause the mobile device 102 to verify it has internet connectivity, and to function as a gateway for the embedded device 104, as described in the above embodiments, between the embedded device 104 and service 103.

In a preferred embodiment, the mobile device is operable to initiate the mobile gateway application if the gateway signal is received whilst the gateway application is not running, whereby such functionality is known to a person skilled in the art. It will be appreciated that a mobile device which does not have a mobile gateway application installed thereon will receive the public broadcast but will not recognise the gateway signal, and will not function as a gateway for the embedded device 104.

It be appreciated that the embedded device 104 comprises cryptographic keys, certificates, e.g. in a certificate chain, and a root key from a trusted issuer, as described in the embodiments above, whereby information relating to the services 103 provided within the device certificate, which may be provided on installation of the device gateway application on the embedded device 104.

The mobile device 102 comprises credentials to demonstrate to the embedded device 104 that it is trusted to act as a gateway between the embedded device 104 and the services 103. In the present embodiment, the credentials of the mobile device 102 comprise a mobile gateway application certificate 122, which is communicated from the trusted issuer 127 to the mobile device 102 e.g. from database server 126 on a request from the gateway application.

In an embodiment, the mobile gateway application certificate 122 is provided with a defined duration, after which the mobile gateway application certificate 122 expires and the mobile gateway application may request an updated mobile gateway application certificate 122. A clock 124 (e.g. a UNIX clock) may be provided within the embedded device 104 for verifying the expiration of the mobile gateway application certificate 122.

When the embedded device 104 is activated, or turned on by a user, the device gateway application causes the embedded device 104 to generate the public broadcast 116 with the gateway signal. The public broadcasts may occur periodically e.g. every second, minute, hour, day or may only occur when, for example, the device requires to upload data to the service 103.

On receiving the public broadcast 116 from the embedded device 104, the mobile gateway application, which is responsive to the gateway signal, checks whether the mobile device 102 has access to the internet 105 (e.g. using 2G, 3G, 4G or WiFi).

If the mobile device 102 has access to the internet 105, the mobile gateway application causes the mobile device 102 to respond to the embedded device 104 to inform it of the available internet connectivity. The response may also comprise credentials of the mobile device, such as the mobile gateway application certificate 122, along with the gateway application's public key, and may further comprise a challenge for the embedded device to prove its identity, for example using a cryptographic nonce as described above. The response may also be encrypted using the root key of the trusted issuer 127, which will be known to the mobile device 102 running the mobile gateway application and to the embedded device 104.

The embedded device 104 decrypts the response (if encrypted) and verifies the credentials of the mobile device 102.

On verifying the credentials of the mobile device 102, the embedded device 104 returns the nonce and further sends its certificates (e.g. the certificate chain) to the mobile device 102 as requested, as described in the examples above, thereby providing mutual authentication of the embedded device 104 and mobile device 102.

If the mobile device 102 verifies that the embedded device 104 is allowed to access the service 103 listed in the certificates then the mobile device 102 provides an encrypted connection between the embedded device 104 and the service 103 requested in the certificate chain. The mobile device 102 also monitors the permissions within the certificate chain (e.g. daily traffic allowance/peak traffic allowance/bandwidth allowance) and ensures that the embedded device 104 does not exceed the permissions. Such permissions encourage devices to spread traffic usage over longer periods.

The mobile gateway application is also operable to set a duration for which the mobile device 102 services the requests in any certificate chain received from the embedded device 102, whereby the mobile device 102 is allowed to stop functioning as a gateway after a set period of time e.g. 1 hour. This would prevent embedded devices 104 being continuously connected to the same mobile device 102 longer than the period set by the mobile gateway application, for example so as to protect an owner of the smartphone from exceeding the daily allowance of the mobile device.

The time limit may be included in the mobile gateway application certificate 122 sent to the embedded device 104. The mobile gateway application certificate 122 may also indicate the allowance which the mobile device 102 is willing to provide for an embedded device 104 seeking to connect thereto (e.g. maximum traffic allowance over a period/max peak traffic allowance/max peak bandwidth allowance). Therefore, if the embedded device 104 has a choice of mobile devices to which it can connect, it can select the mobile device with the most favourable allowances.

Furthermore, once mutual authentication of the mobile device 102 and embedded device 104 is complete, it is possible for the devices to switch from the communications link used for the mutual authentication (BLE in this example), to a different communications link if one is available on the embedded device e.g. WiFi or WiFi direct. In such a scenario, the mobile device 102 could issue a temporary WiFi key to the embedded device 104 e.g. using an encrypted communication, or the mobile device could provide a WiFi MAC address to the embedded device 104, to which the embedded device would connect.

If the authentication fails, for example if the mobile device 102 provides an expired mobile gateway application certificate 122 to the embedded device 104, then the embedded device 104 will not communicate with the internet 105 via mobile device 102, or it may request that the mobile device 102 update its mobile gateway application certificate 122. Alternatively, if the embedded device 104 does not provide all certificates within the certificate chain, then the mobile device is operable to break any communication path between the mobile device 102 and the embedded device 104.

Furthermore, if the mobile device 102 does not have network connectivity, then the mobile device 102 will not respond to the announcement 116. It would also be possible for the mobile device 102 to ignore the gateway signal if the mobile device was approaching its data allowance, or if it was approaching a threshold data allowance, which could be set by a user. For example if a user's daily internet allowance is 1 MB/day, then the user could instruct the mobile gateway application to ignore the gateway signal if the current daily usage is above 85%.

Using the functionality described above, an embedded device which does not have its own internet connection is operable to automatically connect to the internet using a mobile device which does have internet connection, whereby the mobile device is operable to restrict the embedded device's internet access to a particular web service listed in a certificate on the embedded device. This functionality provides an improved user experience, whereby if a user has an embedded device having a device gateway application installed thereon which is compatible with a mobile gateway application on a mobile device in proximity thereto to receive public broadcast therefrom, then the device is operable to securely connect to the internet via the mobile device, with minimal user input. Furthermore, embedded devices without displays can also readily connect to services on the internet.

It will also be appreciated that the functionality described above could also be reversed, whereby the mobile device having internet access may be configured to issue public broadcasts with a known signal (e.g. using a mobile device gateway application installed thereon), to which embedded devices having a corresponding device gateway application, responsive to the known signal can connect to the device, verify its credentials and upload the data to a service listed in a certificate chain of the embedded device. In such a case, the mobile device is promoting the fact that it has network connection, and the embedded device is a device which is awaiting such a broadcast.

Furthermore, it will be appreciated that any expense incurred by the mobile device in providing access to the target service for the embedded device (e.g. due to traffic charges on a network) can be passed to another party e.g. an owner of the target service, and/or an owner of the embedded device may be billed for any communications between the embedded device and target service.

In an illustrative example of such functionality, the embedded device is a temperature sensor within an animal enclosure in a zoo which gathers temperature information within the enclosure and uploads the temperature information to a web service owned by the zoo, whereby the web service is configured to regulate the temperature within the enclosure based on the gathered information.

In the illustrative example, an owner of a smartphone visiting the zoo downloads a zoo mobile gateway application to the smartphone, whereby the zoo mobile gateway application is responsive to a signal within a public broadcast from the temperature sensor.

On receiving the signal, the mobile device provides access to the web service for the temperature sensor to upload its data via the mobile device's internet connection, whereby the zoo can be billed for the data transmitted to the web service. For example, the owner of the smartphone may receive an electronic voucher from the web service via the zoo mobile gateway application, or the zoo may pay the owner's mobile phone operator.

As will be appreciated by one skilled in the art, the present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise subcomponents which may take the form of instructions or sequences of instructions at any of the levels of abstraction, from the direct machine instructions of a native instruction set to high-level compiled or interpreted language constructs.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the scope of the appended claims.

The invention claimed is:

1. A method for controlling communications between a data processing device in a first network and a target service in a second network via a gateway apparatus, the method comprising:
    transmitting a request to communicate with the target service from the data processing device to the gateway apparatus;
    transmitting device credentials from the data processing device to the gateway apparatus, wherein the device credentials comprise information relating to the target service;
    verifying at the gateway apparatus an authentication status of the data processing device based on the device credentials;
    establishing a communication path between the data processing device and the target service if the authentication status is verified;
    transmitting gateway apparatus credentials from the gateway apparatus to the data processing device;
    verifying the gateway apparatus credentials at the data processing device.

2. A method according to claim 1, the method further comprising:
    transmitting an identity authentication challenge from the gateway apparatus to the data processing device;
    transmitting a response to the identity authentication challenge from the data processing device to the gateway apparatus;
    verifying the response to the identity authentication challenge at the gateway apparatus.

3. A method according to claim 2, wherein the identity authentication challenge comprises a nonce wherein the response to the identity authentication challenge comprises signing the nonce with a cryptographic key associated with the data processing device.

4. A method according to claim 1, the method further comprising:
    receiving a traffic policy certificate comprising information relating to the data processing device from a resource associated with a trusted party, wherein the trusted party has a relationship with the gateway apparatus and the data processing device;
    confirming the authentication status of the device credentials with the resource associated with the trusted third party.

5. A method according to claim 4, the method further comprising:
    maintaining the communication path between the data processing device and the target service if the status of the data processing device is authenticated by the resource or terminating the communication path between the data processing device and the target service if the status of the data processing device is not authenticated by the resource.

6. A method according to claim 1, wherein the request to communicate with the target service comprises a signal known to the gateway apparatus, wherein the signal comprises one or more of: a cryptographic key of the trusted party, a string, a class or a globally unique identifier (GUID) and a universally unique identifier (UUID).

7. A method according to claim 6, the method further comprising:
    receiving the signal at the gateway apparatus;
    determining whether access to the second network is available at the gateway apparatus;
    if it is determined that access to the second network is available, communicating the availability of access to the data processing device.

8. A method according to claim 1, the method further comprising:
    provisioning the data processing device from the target service.

9. A method according to claim 1, the method further comprising:
    limiting communication between the data processing device and the target service in one direction.

10. A method according to claim 1, the method further comprising:
    monitoring data communications between the data processing device and the target service and attributing responsibility for the data communications to a party.

11. A method for controlling communications between a data processing device in a first network and a target service in a second network via a gateway apparatus, the method comprising:
    transmitting a request to communicate with the target service from the data processing device to the gateway apparatus;
    transmitting device credentials from the data processing device to the gateway apparatus, wherein the device credentials comprise information relating to the target service;
    verifying at the gateway apparatus an authentication status of the data processing device based on the device credentials;
    establishing a communication path between the data processing device and the target service if the authentication status is verified, wherein the device credentials comprise a device certificate issued by the trusted party, wherein the device certificate comprises the information relating to the target service, wherein the device certificate further comprises permissions associated with the data processing device, and wherein the permissions include one or more of: bandwidth allowance, traffic allowance over a period, and peak traffic allowance for a defined period.

12. A method according to claim 11, wherein the device credentials comprises a certificate chain, wherein the certificate chain is traceable to the trusted party.

13. A method for controlling communications between a data processing device in a first network and a target service in a second network via a gateway apparatus, the method comprising:

connecting the data processing device to a node of a plurality of nodes in the first network using an unsecure network connection of the node, wherein the first network comprises a mesh network;

transmitting a request to communicate with the target service from the data processing device to the gateway apparatus using the shortest communication path through the mesh network;

transmitting device credentials from the data processing device to the gateway apparatus, wherein the device credentials comprise information relating to the target service;

verifying at the gateway apparatus an authentication status of the data processing device based on the device credentials;

establishing a communication path between the data processing device and the target service if the authentication status is verified.

14. A method according to claim 13, the method further comprising:

encrypting the communication path through the mesh network.

15. A method according to claim 13, wherein one or more of the steps of: connecting the data processing device to a node of the plurality of nodes; transmitting the request from the node to the gateway apparatus; and transmitting the request to communicate with the target service occurs over one of Bluetooth Low Energy, WiFi, WiFi direct, or Zigbee.

16. A method for controlling communications between a data processing device in a first network and a target service in a second network via a gateway apparatus, the method comprising:

transmitting a request to communicate with the target service from the data processing device to the gateway apparatus;

transmitting device credentials from the data processing device to the gateway apparatus, wherein the device credentials comprise information relating to the target service;

verifying at the gateway apparatus an authentication status of the data processing device based on the device credentials;

establishing a communication path between the data processing device and the target service if the authentication status is verified, wherein the gateway apparatus comprises a node within a mesh network.

* * * * *